Nov. 28, 1950 — J. G. MARTIN — 2,531,696
FRICTION DISK
Filed Dec. 7, 1945 — 2 Sheets-Sheet 1

INVENTOR.
JOHN G. MARTIN.
BY
T. J. Plante
ATTORNEY.

Nov. 28, 1950    J. G. MARTIN    2,531,696
FRICTION DISK
Filed Dec. 7, 1945    2 Sheets-Sheet 2
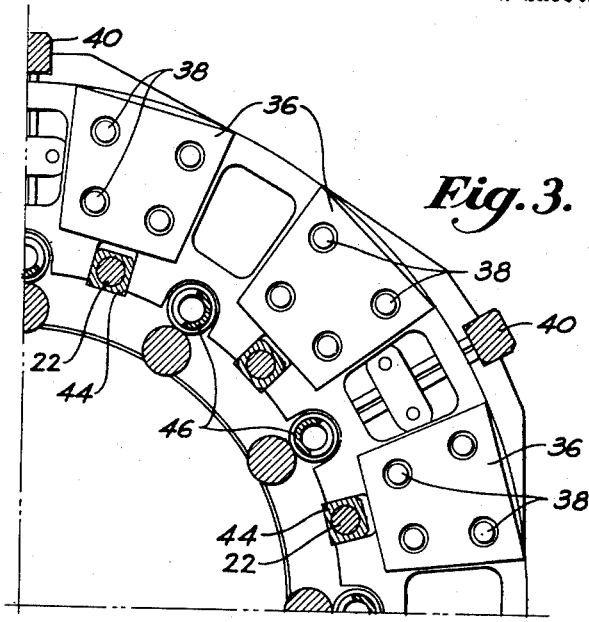
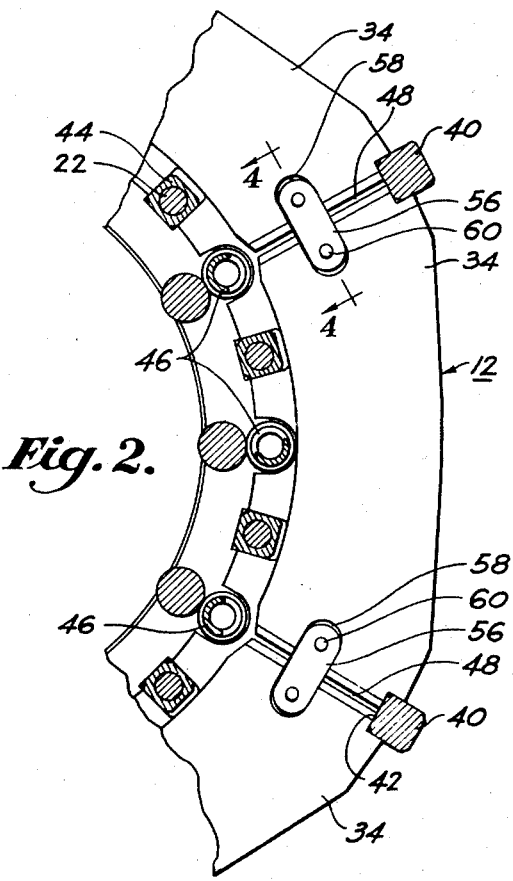
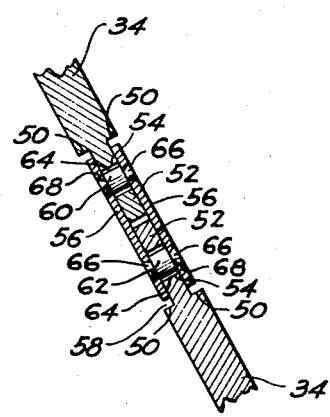
INVENTOR.
JOHN G. MARTIN.
BY
L. J. Plante
ATTORNEY.

Patented Nov. 28, 1950

2,531,696

UNITED STATES PATENT OFFICE 2,531,696

FRICTION DISK

John G. Martin, South Bend, Ind., assignor to Bendix Aviation Corporation, South Bend, Ind., a corporation of Delaware Application December 7, 1945, Serial No. 633,407

12 Claims. (Cl. 188—72)

This invention relates to friction discs, and particularly to friction discs which constitute the primary braking components of disc brakes.

In a friction disc composed of a plurality of separate segments, it is proposed to provide improved means for retaining the segments in assembled form, said improved retaining means having, among others, the following advantages: (1) it is not possible for the retaining means to become disengaged from the friction disc assembly and (2) it is impossible for the segments to get so far out of line with one another as to catch on edges associated with the cooperating friction disc.

In a disc brake wherein either the stator or the rotor discs are lined with the usual friction lining material, the discs which will be composed of separate segments will be the unlined discs. In certain instances, in order to obtain increased ventilation of the friction discs, and thereby improve heat dissipation, it is found desirable to apply segments of lining to the lined discs, which segments will be spaced from one another to provide an air passage. In some cases, it may be desirable to provide friction lining material over only a portion of the total surface of the lined disc, and in other cases the braking pressure may not be applied around the full disc, and consequently the friction surface of the unsegmented discs will be less than a complete annulus. Under these circumstances, if the segments of the segmented disc are able to move laterally a substantial distance relative to one another, or in other words to get out of lateral alignment, there is the danger that they will tend to catch the edges of the friction lining of the cooperating discs during application of the brakes. If this should happen, the heavy impact of the segment edges against the lining edges would create a very objectionable thumping in the brake and would cause a great increase in the rapidity of lining wear.

Furthermore, where a segmented disc cooperates with a lined segment on which the lining is not substantially continuous, unless the members which retain the segments in assembled relationship are themselves prevented from substantial lateral movement relative to the segments, it is possible for such retaining members to fall out of assembled position, thereby removing the connections between adjacent segments.

An additional object of the present invention, related to the objects heretofore discussed, is to provide relatively inexpensive and easily assembled means for positively connecting the segments of a friction disc in such a way as to obtain the objects heretofore mentioned.

Other objects and advantages of the present invention will become apparent during the following discussion, reference being had therein to the accompanying drawings, in which:

Figure 2 is a partial cross-section taken on the line 2—2 of Figure 1;

Figure 3 is a partial cross-section taken on the line 3—3 of Figure 1; and

Figure 4 is an enlarged section taken on the line 4—4 of Figure 2.

Figure 1:
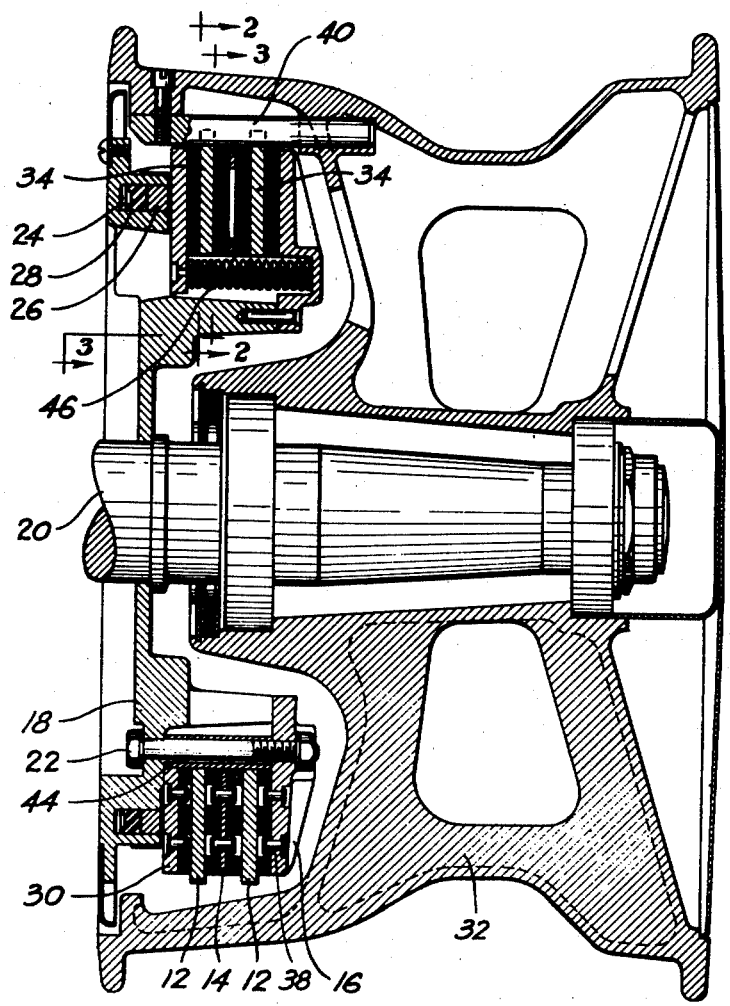
Figure 1 is a vertical section taken through a disc brake assembly which incorporates the present invention.

Referring to the drawings, a disc brake incorporating the present invention may, in general, comprise one or more rotor discs 12, one or more stator discs 14 interleaved with the rotor discs, a backing plate 16, and a support member 18. The support member 18 is secured by suitable means to a fixed part of the vehicle, such as the axle 20. Although the principles of the present invention are equally applicable to brakes for any use, and even to clutches and the like, the illustrated brake is intended to be used on an airplane, and therefore the axle 20 does not rotate. The backing plate 16 may be secured to support member 18 by means of a plurality of circumferentially spaced axially extending bolts 22, the arrangement being such that neither support member 18 nor backing plate 16 is capable of either rotating or axial movement.

Member 18 supports suitable means for developing brake applying pressure. In this case an annular chamber 24 is provided in member 18 and within this chamber reciprocates an annular piston 26 provided with the usual resilient sealing member 28. When fluid under pressure is admitted to chamber 24 from a suitable pressure developing unit, piston 26 is moved toward the right (as seen in Figure 1) to act on a pressure plate 30, moving said plate also toward the right to develop a frictional force between the rotor discs 12 on the one hand and the stationary brake members on the other hand, thereby retarding rotation of the vehicle wheel 32.

Either the rotor discs or the stator discs are composed of a plurality of separate segments, and those discs which are not segmented are lined with suitable friction material.

In the present case the preferred arrangement is shown, wherein the rotor discs 12 are composed of a plurality of separate segments 34 (see Figure 2), and the nonrotating brake members have fixed to the surfaces thereof suitable friction lining material. In order to obtain the maximum cooling effect in the brake assembly, I prefer, instead of having a single annular friction lining for each brake surface of the nonrotating brake members, to provide a suitable number of circumferentially spaced lining segments 36 secured to the respective brake member by means of rivets 38 or the like. Both surfaces of stator disc 14 have a plurality of such lining segments secured thereto, and the leftward surface of backing plate 16, and rightward surface of pressure plate 30 also have lining segments secured thereto.

In order to permit axial movement of the rotor discs 12 during application of the brakes, while at the same time causing the rotors to turn with the wheel 32, a plurality of axially extending driving elements or torque-taking keys 40 are provided. These keys, which extend through notches 42 provided in the peripheries of the rotor discs, are circumferentially spaced about the rotor discs, there being the same number of keys as there are rotor segments. In the preferred arrangement, which is shown, each driving key is located between a pair of adjacent segments. Thus each segment is driven from the rear during rotation of the wheel. When the wheel is rotating in one direction, a given key acts on one of the adjacent segments and when the wheel is rotating in the other direction the same key acts on the other adjacent segment.

Pressure plate 30 and stator disc 14 are also capable of axial movement, although prevented from rotating. For this purpose, pressure plate 30 and stator disc 14 are provided with a plurality of notches to receive sleeve members 44, through which the bolts 22 extend.

Pressure plate 30 is normally retained in released position by means of a plurality of circumferentially spaced return springs 46 compressed between said plate and backing plate 16.

It will be apparent from the drawings that a sufficient space 48 is permitted between the adjacent ends of each pair of adjacent segments to allow substantially free individual expansion of the segments under the influence of heat, thereby largely avoiding the harmful effects which might otherwise result from the development of excessive heat in the brake.

In order to retain the several segments 34 of the rotor discs in assembled relationship, I provide means for positively but loosely interconnecting said segments. Near each end of each segment there are provided a pair of grooves 50 (see Figure 4) located at the opposite sides of the respective segment and extending inwardly from the end thereof. Cutting of the grooves 50 into the surfaces of segments 34 provides a reduced thickness portion 52 at each end of each segment, and an opening or hole 54 extends transversely through each of the reduced thickness portions 52 to interconnect each pair of opposed grooves 50.

The grooves 50 at the adjacent ends of adjacent segments are substantially in alignment, as shown, and a connecting member in the form of a thin plate or link 56 extends from one to the other of each pair of tangentially aligned grooves. A pair of such plates or links 56 is used to interconnect the adjacent ends of each pair of adjacent segments, there being a link on each side of the segments. The links 56 are thin enough to lie entirely within the grooves 50, and their outer surfaces therefore will not come into contact with the surfaces of the lining segments 36. At each end of each link there is a clearance 58 provided between the end of the link and the edge of the respective groove 50, thus permitting substantial endwise movement of the links with respect to the segments.

Each pair of links 56 is held together by means of two rivet pins 60. These rivet pins 60 extend through the holes 54 provided in the segments. The center portion 62 of each rivet pin is of such diameter as to permit a substantial clearance 64 between the rivet pin and the respective hole 54 in the segment. Extending outwardly from each side of center portion 62 of each rivet pin is a reduced thickness end portion 66 which is received in a suitable opening 68 provided in the respective plate 56. The rivet pins 60 are suitably secured to the plates 56, providing a relatively rigid assembly, insofar as the plates and rivet pins themselves are concerned.

With the present means for interconnecting adjacent segments, lateral movement of the segments with respect to one another is narrowly limited, although a relatively large amount of relative circumferential movement of the ends of the segments is permissible, in order to permit substantially free individual expansion of the segments as the brake parts are heated. Interconnection of the segments to form a friction disc assembly is particularly important for two reasons, (1) it is desirable to provide a loosely articulated disc which can be conveniently handled during assembling of the brake, and (2) it is necessary to counteract the effect of twisting stresses on the segments while the brake is in use. At the same time, the connection between the segments must be sufficiently loose to permit expansion, as discussed above. The present construction quite adequately accomplishes these results.

In order to allow a slight lateral movement of the segments relative to one another, thereby obtaining perfect alignment thereof, I prefer to allow a very slight clearance between the reduced thickness portions 52 of the segments and the links 56, the clearance being so slight that it is not shown in the figures. This clearance is determined by the shoulders formed on pins 60 between the center portion 62 of each pin and the reduced end portions thereof.

I prefer to assemble my improved friction disc as follows. Into the holes 68 provided in one of the plates 56 there are first inserted the two rivet pins 60, the heads of these rivet pins being frusto-conical to fit said openings. The pair of adjacent segments are then assembled on the pins, after which the second plate is assembled on the protruding cylindrical ends of the rivets. And finally, the protruding ends of the rivets are upset to secure the second plate thereto, and complete the assembling of the adjacent segments.

After this assembling operation has been completed, the pins 60 prevent the links 56 from becoming disassembled, and the links in turn hold the segments in close lateral alignment.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A disc brake comprising a lined friction member having less than a full continuous annulus of lining material, a plurality of circumferentially spaced axially extending torque-taking keys, a friction disk adapted to frictionally engage said friction member composed of a plurality of separate segments, spaced sufficiently from one another to permit substantially free individual expansion under the influence of heat, each of said segments having a notch thereacross receiving one of said torque-taking keys to prevent relative rotational movement between the segment and the key while permitting axial movement of the segment along the key, and each of said segments having, extending inwardly from each end thereof, a reduced thickness portion providing a groove at each side of the segment, said reduced thickness portion having a hole therethrough interconnecting the opposed grooves, the grooves at adjacent ends of adjacent segments being substantially in alignment, and means interconnecting the several segments comprising a plurality of pins, each of which extends through a corresponding one of said holes, there being substantial clearance between the outer diameter of each pin and the inner diameter of the respective hole, each end of each pin being reduced in diameter and extending into one of the aforementioned grooves, and a plurality of pairs of plates interconnecting the pins provided at adjacent ends of adjacent segments to loosely but positively retain the segments in assembled relationship, the plates of each pair being located at opposite sides of the segments to limit lateral movement of said segments relative to one another, each of said plates lying in the aligned grooves of two adjacent segments and having a hole near each end receiving the reduced diameter end portion of the respective pin, said plates having end clearance in the grooves, and the reduced diameter end portions of said pins being riveted to the plates, with the plates resting against the shoulders provided by the larger diameter center portions of the pins to provide a slight clearance between the plates and the reduced thickness portions of the segments.

2. A disc brake comprising a lined friction member having less than a full continuous annulus of lining material, a plurality of circumferentially spaced axially extending torque-taking keys, a friction disk adapted to frictionally engage said friction member composed of a plurality of separate segments spaced sufficiently from one another to permit substantially free individual expansion under the influence of heat, each of said segments having a notch thereacross receiving one of said torque-taking keys to prevent relative rotational movement between the segment and the key while permitting axial movement of the segment along the key, and means interconnecting the several segments comprising a plurality of pins extending through transverse openings provided in the segments near the ends thereof, there being two pins for each segment, one near each end thereof, and a plurality of members interconnecting the pins provided at adjacent ends of adjacent segments to loosely but positively retain the segments in assembled relationship, the ends of the pins being formed to retain the pins and said interconnecting members against lateral displacement from the friction disc assembly.

3. In a disc brake, a friction disc composed of a plurality of separate segments spaced sufficiently from one another to permit substantially free individual expansion under the influence of heat, each of said segments having, extending inwardly from each end thereof, a reduced thickness portion providing a groove at each side of the segment, said reduced thickness portion having a hole therethrough interconnecting the opposed grooves, the grooves at adjacent ends of adjacent segments being substantially in alignment, and means interconnecting the several segments comprising a plurality of pins, each of which extends through a corresponding one of said holes, there being substantial clearance between the outer diameter of each pin and the inner diameter of the respective hole, each end of each pin being reduced in diameter and extending into one of the aforementioned grooves, and a plurality of pairs of plates interconnecting the pins provided at adjacent ends of adjacent segments to loosely but positively retain the segments in assembled relationship, the plates of each pair being located at opposite sides of the segments to limit lateral movement of said segments relative to one another, each of said plates lying in the aligned grooves of two adjacent segments and having a hole near each end receiving the reduced diameter end portion of the respective pin, said plates having end clearance in the grooves, and the reduced diameter end portions of said pins being riveted to the plates, with the plates resting against the shoulders provided by the larger diameter center portions of the pins to provide a slight clearance between the plates and the reduced thickness portions of the segments.

4. A friction disc composed of a plurality of separate segments spaced sufficiently from one another to permit substantially free individual expansion under the influence of heat, each of said segments having, extending inwardly from each end thereof, a reduced thickness portion providing a groove at each side of the segment, said reduced thickness portion having a hole therethrough interconnecting the opposed grooves, a plurality of pins, each of which extends through a corresponding one of said holes, there being substantial clearance between the outer diameter of each pin and the inner diameter of the respective hole, each end of each pin being reduced in diameter and extending into one of the aforementioned grooves, and a plurality of pairs of link members interconnecting the pins provided at adjacent ends of adjacent segments to loosely but positively retain the segments in assembled relationship, the link members of each pair being located at opposite sides of the segments to limit lateral movement of said segments relative to one another, each of said link members extending into the adjacent grooves of two adjacent segments and having a hole near each end in which is retained the reduced diameter end portion of the respective pin.

5. A friction disc composed of a plurality of separate segments, each of said segments having, extending inwardly from each end thereof, a reduced thickness portion providing a groove at each side of the segment, said reduced thickness portion having a hole therethrough interconnecting the opposed grooves, the grooves at adjacent ends of adjacent segments being substantially in alignment, and means interconnecting the several segments comprising a plurality of pins, each of which extends through a corresponding one of said holes, there being substantial clearance between the outer diameter of each pin and the inner diameter of the respective hole, each end of each pin being reduced in diameter and extending into one of the aforementioned grooves, and a plurality of pairs of plates interconnecting the pins provided at adjacent ends of adjacent segments to loosely but positively retain the segments in assembled relationship, the plates of each pair being located at opposite sides of the segments to limit lateral movement of said segments relative to one another, each of said plates lying in the aligned grooves of two adjacent segments and having a hole near each end receiving the reduced diameter end portion of the respective pin, said plates having end clearance in the grooves, and the reduced diameter end portions of said pins being riveted to the plates, with the plates resting against the shoulders provided by the larger diameter center portions of the pins to provide a slight clearance between the plates and the reduced thickness portions of the segments.

6. A disc brake comprising a friction member, a plurality of circumferentially spaced axially extending torque-taking keys, a friction disk adapted to frictionally engage said friction member composed of a plurality of separate segments spaced sufficiently from one another to permit substantially free individual expansion under the influence of heat, each of said segments having a notch thereacross receiving one of said torque-taking keys to prevent relative rotational movement between the segment and the key while permitting axial movement of the segment along the key, and means interconnecting the several segments comprising a plurality of pins extending through transverse openings provided in the segments near the ends thereof, there being two pins for each segment, one near each end thereof, and members interconnecting the pins provided at adjacent ends of adjacent segments to loosely but positively retain the segments in assembled relationship, said interconnecting members being located radially between the inner and outer edges of the segments and axially between the spaced friction surfaces of the segments, the ends of the pins being formed to retain the pins and the interconnecting members against lateral displacement from the friction disc assembly.

7. A friction disc composed of a plurality of separate segments spaced sufficiently from one another to permit substantially free individual expansion under the influence of heat, each of said segments having, extending inwardly from each end thereof, a reduced thickness portion providing a groove at each side of the segment, said reduced thickness portion having a hole therethrough interconnecting the opposed grooves, a plurality of pins, each of which extends through a corresponding one of said holes, there being substantial clearance between the outer diameter of each pin and the inner diameter of the respective hole, and a plurality of pairs of link members interconnecting the pins provided at adjacent ends of adjacent segments to loosely but positively retain the segments in assembled relationship, the link members of each pair being located at opposite sides of the segments to limit lateral movement of said segments relative to one another, each of said link members extending into the adjacent grooves of two adjacent segments and having a hole near each end in which is retained the end portion of the respective pin.

8. A friction disc composed of a plurality of separate segments spaced sufficiently from one another to permit substantially free individual expansion under the influence of heat, each of said segments having, extending inwardly from each end thereof, a reduced thickness portion providing a groove at each side of the segment, said reduced thickness portion having a hole therethrough interconnecting the opposed grooves, a plurality of pins, each of which extends through a corresponding one of said holes, there being substantial clearance between the outer diameter of each pin and the inner diameter of the respective hole, and a plurality of link members interconnecting the pins provided at adjacent ends of adjacent segments to loosely but positively retain the segments in assembled relationship, each of said link members lying in the adjacent grooves of two adjacent segments and being arranged to prevent appreciable lateral movement of one of the segments with respect to the other.

9. A friction disk composed of a plurality of separate segments spaced sufficiently from one another to permit substantially free individual expansion under the influence of heat, each of said segments having a transverse opening therethrough near each end thereof, a plurality of pins, each of which extends through a corresponding one of said openings, there being substantial clearance between the outer diameter of each pin and the inner diameter of the respective opening, and link members interconnecting the pins provided at adjacent ends of adjacent segments to loosely but positively retain the segments in assembled relationship, the link members engaging the segments laterally to limit lateral movement of said segments relative to one another.

10. A friction disk composed of a plurality of separate segments spaced sufficiently from one another to permit substantially free individual expansion under the influence of heat, and a plurality of link members connected between the ends of adjacent segments to loosely but positively retain the several segments in disc form, said link members engaging the segments on opposite sides thereof to positively limit the relative lateral movement thereof.

11. A disc brake comprising a friction member, a plurality of circumferentially spaced axially extending torque-taking keys, a friction disc adapted to frictionally engage said friction member composed of a plurality of separate segments spaced sufficiently from one another to permit substantially free individual expansion under the influence of heat, each of said segments having a notch thereacross receiving one of said torque-taking keys to prevent relative rotational movement between the segment and the key while permitting axial movement of the segment along the key, and a plurality of link members connected between the ends of adjacent segments to loosely but positively retain the several segments in disc form, said link members engaging the segments on opposite sides thereof to positively limit relative lateral movement thereof.

12. A friction disc composed of a plurality of separate segments spaced sufficiently from one another to permit substantially free individual expansion under the influence of heat, each of said segments having an opening therethrough near each end thereof, and a plurality of interconnecting members which have end portions extending into the openings provided in adjacent segments to retain the segments in disc form and which engage the opposite sides of the segments to positively limit relative lateral movement thereof.

JOHN G. MARTIN.

REFERENCES CITED

The following references are of record in the file of this patent:

UNITED STATES PATENTS

| Number | Name | Date |
|---|---|---|
| 286,870 | True | Oct. 16, 1883 |
| 1,479,974 | Sturt et al. | Jan. 8, 1924 |
| 1,588,305 | Buisson | June 8, 1926 |
| 1,708,645 | Wright | Apr. 9, 1929 |
| 2,153,280 | Shelor | Apr. 4, 1939 |
| 2,423,882 | Frank | July 15, 1947 |